United States Patent
Tan et al.

(10) Patent No.: US 10,830,044 B1
(45) Date of Patent: Nov. 10, 2020

(54) SYSTEM AND METHOD FOR REMOTELY LOCATING COMMUNICATION ERROR SUPPORT FOR HYDRAULIC SUPPORTS

(71) Applicants: CHINA UNIVERSITY OF MINING AND TECHNOLOGY, Xuzhou (CN); XUZHOU GOLDFLUID HYDRAULIC TECHNOLOGY DEVELOPMENT CO., LTD., Xuzhou (CN)

(72) Inventors: Chao Tan, Xuzhou (CN); Zhongbin Wang, Xuzhou (CN); Hongya Zhou, Xuzhou (CN); Lei Si, Xuzhou (CN); Xinhua Liu, Xuzhou (CN); Xuliang Lu, Xuzhou (CN); Xiaoyu Li, Xuzhou (CN); Bowen Liu, Xuzhou (CN); Yue Wu, Xuzhou (CN); Honglin Wu, Xuzhou (CN)

(73) Assignees: CHINA UNIVERSITY OF MINING AND TECHNOLOGY, Xuzhou (CN); XUZHOU GOLDFLUID HYDRAULIC TECHNOLOGY DEVELOPMENT CO., LTD., Xuzhou (CN)

(*) Notice: Subject to any disclaimer, the term of this patent is extended or adjusted under 35 U.S.C. 154(b) by 0 days.

(21) Appl. No.: 16/632,375

(22) PCT Filed: Jun. 18, 2019

(86) PCT No.: PCT/CN2019/091632
§ 371 (c)(1),
(2) Date: Jan. 20, 2020

(87) PCT Pub. No.: WO2020/147260
PCT Pub. Date: Jul. 23, 2020

(30) Foreign Application Priority Data

Jan. 18, 2019 (CN) .......................... 2019 1 00478270

(51) Int. Cl.
*E21D 23/12* (2006.01)
*H04L 12/40* (2006.01)
*E21D 23/14* (2006.01)

(52) U.S. Cl.
CPC ........ *E21D 23/148* (2016.01); *H04L 12/4011* (2013.01); *H04L 2012/40215* (2013.01)

(58) Field of Classification Search
CPC ............... E21D 23/148; H04L 12/4011; H04L 2012/40215
See application file for complete search history.

(56) References Cited

U.S. PATENT DOCUMENTS

2004/0221713 A1* 11/2004 Mundry .................. E21D 23/26
91/1
2006/0047431 A1 3/2006 Geiser
(Continued)

FOREIGN PATENT DOCUMENTS

CN 102323566 A 1/2012
CN 202331192 U 7/2012
(Continued)

*Primary Examiner* — Benjamin F Fiorello
(74) *Attorney, Agent, or Firm* — Bayramoglu Law Offices LLC

(57) ABSTRACT

A system and method for remotely locating a communication error support for hydraulic supports. The system includes a control panel, a support controller, a data converter, and two support drivers of the same type. Each support driver has two bus interfaces. The control panel transmits a control command to the data converter in a form of a WiFi signal. The data converter converts the WiFi signal into a message signal and transmits the message signal to the support controller. The support controller transmits the control command to the two support drivers, respectively. The support drivers transmit the command through CANH twisted pairs and CANL twisted pairs. When a bus for (Continued)

transmitting the command of a certain node has an error, the support controller calculates the fault node according to a formula $$n = \frac{pt}{8m},$$

and feeds back the fault node onto the control panel.

14 Claims, 5 Drawing Sheets

(56) References Cited

U.S. PATENT DOCUMENTS

| 2017/0169631 A1* | 6/2017 | Walker | G07C 5/02 |
| 2018/0135412 A1* | 5/2018 | Tian | G05B 19/054 |
| 2019/0003304 A1* | 1/2019 | Song | E21C 35/24 |
| 2019/0051431 A1* | 2/2019 | Orban | H01B 9/003 |

FOREIGN PATENT DOCUMENTS

| CN | 104990549 A | 10/2015 |
| CN | 105065050 A | 11/2015 |
| CN | 109826660 A | 5/2019 |

* cited by examiner

SYSTEM AND METHOD FOR REMOTELY LOCATING COMMUNICATION ERROR SUPPORT FOR HYDRAULIC SUPPORTS

CROSS REFERENCE TO THE RELATED APPLICATIONS

This application is the national phase entry of International Application No. PCT/CN2019/091632, filed on Jun. 18, 2019, which is based upon and claims priority to Chinese Patent Application No. 201900478270, filed on Jan. 18, 2019, the entire contents of which are incorporated herein by reference.

TECHNICAL FIELD

The present invention relates to a hydraulic support, and specifically relates to a system and method for better remotely locating a communication error support for hydraulic supports, and belongs to the technical field of underground hydraulic supports.

BACKGROUND

A hydraulic support is main support equipment in "three-machine" assorted equipment for a fully mechanized coal mining face, but there are some interference factors such as vibration, electromagnetic interference, system noise, dust and random noise in an underground working face environment, which easily causes faults such as signal loss on a bus and a software error, resulting in phenomena such as a node failure, transmission interruption, or packet loss. Although a controller area network (CAN) bus of the hydraulic support already has a certain error detection function, due to the difficulty in underground wiring, debris of coal rock fallen on the ground easily causes a circuit to wear and affects reliability and accuracy of communication. Once there is a hydraulic support node has a communication error, communication states of other hydraulic supports will be affected, and shutdown will even be resulted in, causing immeasurable economic loss. Therefore, when there is a support node being faulted, measures need to be taken immediately for repairing, but the underground environment is dark and dusty, so it is time-wasting and labor-wasting if the fault node is determined by one-by-one manual detection. Therefore, the above deficiency restricts the development of an underground unmanned production technology all the time.

SUMMARY

In order to overcome shortcomings in the prior art, the present invention provides a system and method for remotely locating a communication error support for hydraulic supports, which can accurately and quickly locate a fault node, lower work intensity of an underground worker and improve working efficiency of the hydraulic supports.

In order to achieve the above inventive objective, the present invention provides a system for remotely locating a communication error support for hydraulic supports, including a control panel configured to display a communication error support address and a control command, a support controller, a data converter inserted into a bus interface of the support controller, and two support drivers of the same type connected with interfaces of the support controller. Each support driver has two bus interfaces respectively connected to a controller area network high-speed (CANH) twisted pair and a controller area network low-speed (CANL) twisted pair. The control panel transmits the control command to the data converter in a form of a wireless fidelity (WiFi) signal. The data converter converts the WiFi signal into a message signal and transmits the message signal to the support controller. The support controller transmits the control command to the two support drivers, respectively. The support drivers transmit the command through the CANH twisted pairs and the CANL twisted pairs. When a bus for transmitting the command of a certain node has an error, the support controller calculates the fault node according to a formula $$n = \frac{pt}{8m},$$

and feeds back the fault node onto the control panel, where m is the number of bytes of a message transmitted at each time; t is time timed by a timer; and p is a network speed of a CAN bus, and a unit is kbps.

Each controller corresponds to two support drivers, and interfaces corresponding to each support driver are connected with two twisted pairs, respectively. Since the same command message is transmitted to the two drivers, even if one circuit is faulted, the control command may also be transmitted to the other two twisted pairs through the other driver. Therefore, an action process of the hydraulic support may not be delayed. Once a certain communication node is faulted, the support controller may automatically detect a specific position of the fault node according to a preset program, and feeds back the position to the control panel, so that an underground worker may clear a fault quickly and accurately.

Further, the support controller has a timing module and a counting module.

In order not to delay a production task, the system further includes an Ethernet control module. The data converter is an Ethernet switchboard, a fiber switch and a fiber switchboard. In a daily state, the Ethernet control module is in a dormant state, and the Ethernet control module is activated when buses corresponding to the support drivers are all faulted, so that the control panel may transmit the control command through an Ethernet.

A method for remotely locating a communication error support for hydraulic supports includes the following steps:

step I, initializing a program; transmitting, by a control panel, a command to a support controller through a data converter; transmitting, by the support controller, information to two drivers, respectively;

step II, receiving, by the two drivers, the command, and transmitting the command to CANH twisted pairs and CANL twisted pairs, wherein by a principle of time optimization, the command reaching the twisted pairs at first is used as a receiving command, and a response command is returned to the controller according to an original path and finally transmitted to the control panel;

step III, forcing command transmission to be ended when a bus for transmitting the command of a certain node has an error; repeatedly transmitting, by the support controller, the command again; triggering a timer when a message is transmitted for the (N+1)th time; ending timing when a transmitted signal reaches the fault node, wherein if a main node is a first hydraulic support, the nth hydraulic support is faulted, and the main node is a hydraulic support node corresponding to the support controller; and step IV, calculating, by the support controller, the fault node according to a formula $$n = \frac{t}{t'} = \frac{pt}{8m},$$

and feeding back the fault node onto the control panel, where m is the number of bytes of the message transmitted at each time; t is time timed by a timer; and p is a network speed of a CAN bus, and a unit is kbps.

Preferably, the data converter is CANWiFi-200T, which is high-performance industrial-level WiFi to CAN-bus data conversion equipment configured to convert a WiFi signal transmitted from the control panel into a CAN message capable of being received by the support controller.

In the step III, the support controller repeatedly transmits the command again, and the timer is triggered when the message is transmitted for the (N+1)th time. N is equal to 20.

In the step III, when two buses of a certain hydraulic support are both faulted in transmission, an Ethernet control module is switched to a working mode, and transmits the command sent from the control panel to the support controller through an Ethernet switchboard, a fiber switch and a fiber switchboard.

Preferably, the support controller is an SJA1000 controller, which is configured to process, transmit and receive an instruction transmitted from the control panel, and transmit the instruction to the support drivers.

Preferably, the drivers are PCA82C250, which provide interfaces connected with the twisted pairs to transmit message information.

Preferably, when the support drivers control groups of hydraulic supports, each group includes 5 or less hydraulic supports.

The disadvantage of a support and shield type hydraulic support is that since a support is short in retraction time, general hydraulic supports all use instant support, i.e., support declining, support movement, support rising and push-sliding, and if each action is slow, the working face will be in an empty-roof state for a long time, so that the risk of roof caving and collapse may be greatly increased. It is verified by experiments that when five hydraulic supports are used for group control, areas of top beams of five hydraulic supports will be in the empty-proof state even if the hydraulic supports act. Since there are more than one hundred remaining supports supporting the working face of a goaf, there is no risk of collapse. If six or more hydraulic supports are used for the group control, the probability of collapse will be greatly increased. In summary, five hydraulic supports are selected for the group control.

By adoption of the two support drivers, the present invention greatly decreases a fault rate of bus communication, and automatically detects and remotely locates the fault node through a preset program in a communication process, so that the reliability of automatic control of the underground hydraulic supports is improved, thus effectively reducing the work intensity of the underground worker and improving the working efficiency of the hydraulic supports.

DETAILED DESCRIPTION OF THE EMBODIMENTS

The present invention is described in detail below with reference to the accompanying drawings and specific embodiments.

Figure 1:
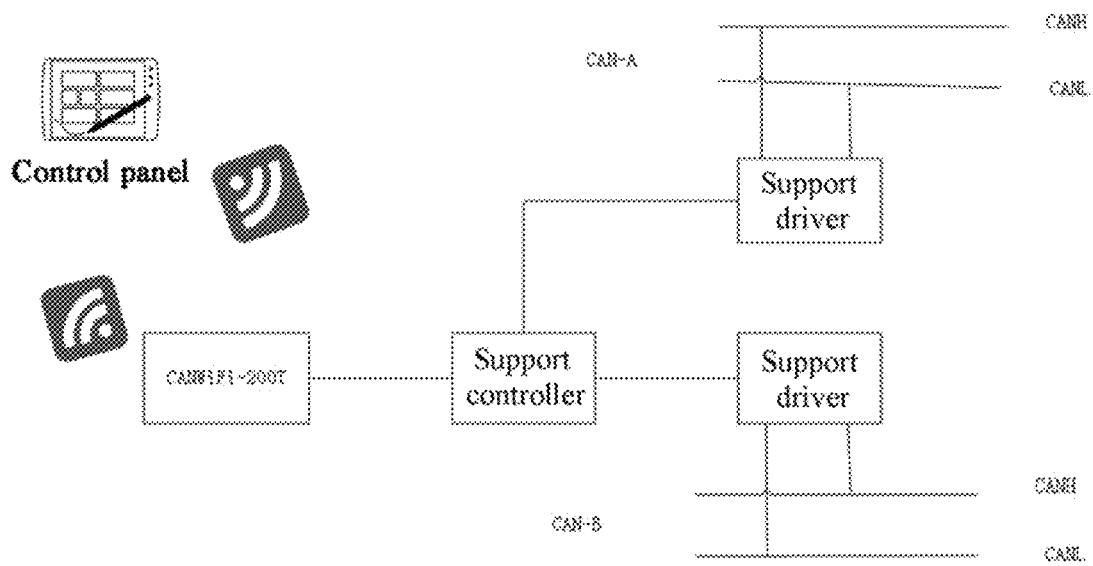
FIG. 1 is a schematic structural diagram of a system in the present invention.
Figure 2:
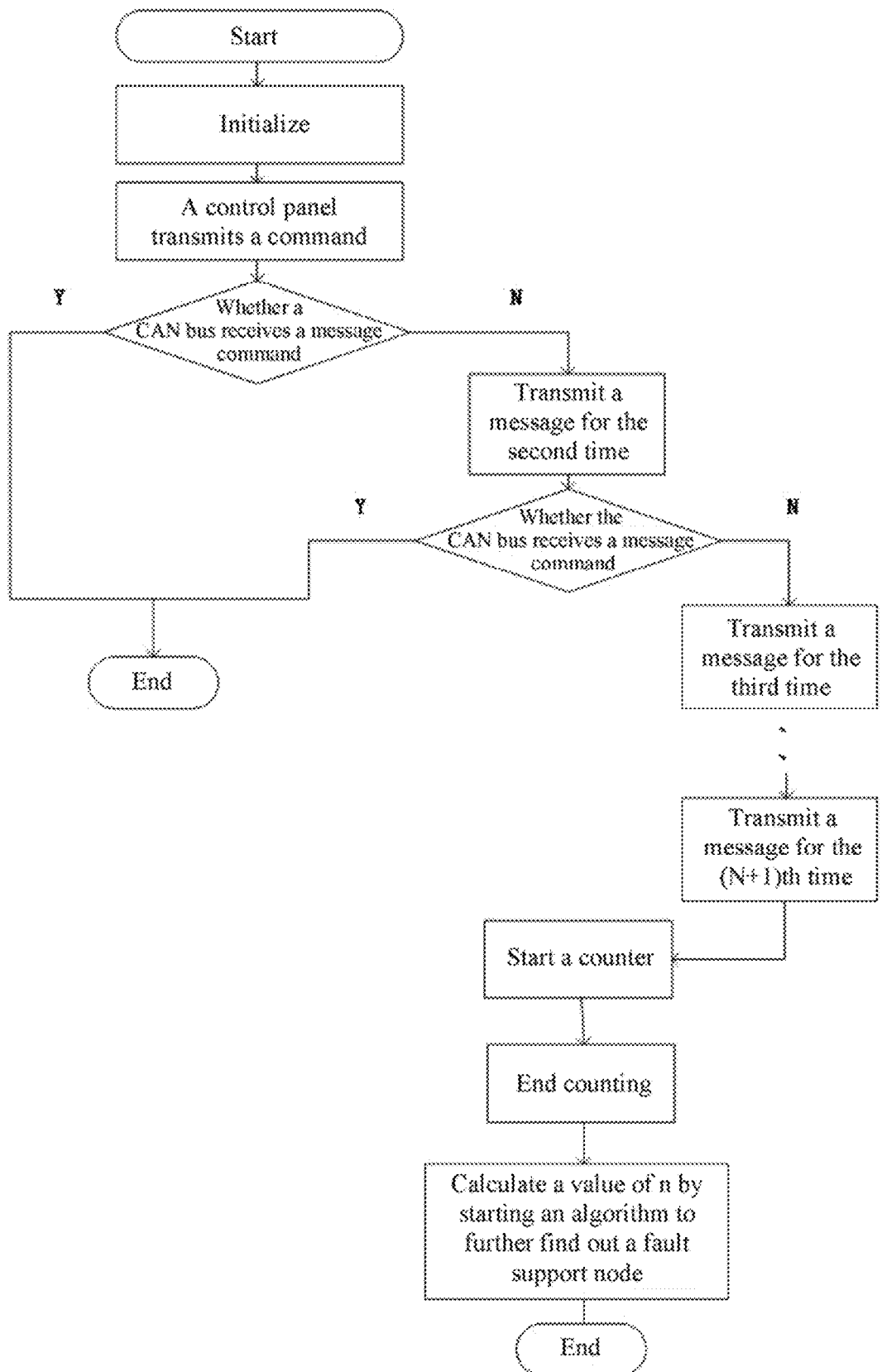
FIG. 2 is a control flow chart of a method in the present invention.
Figure 5:
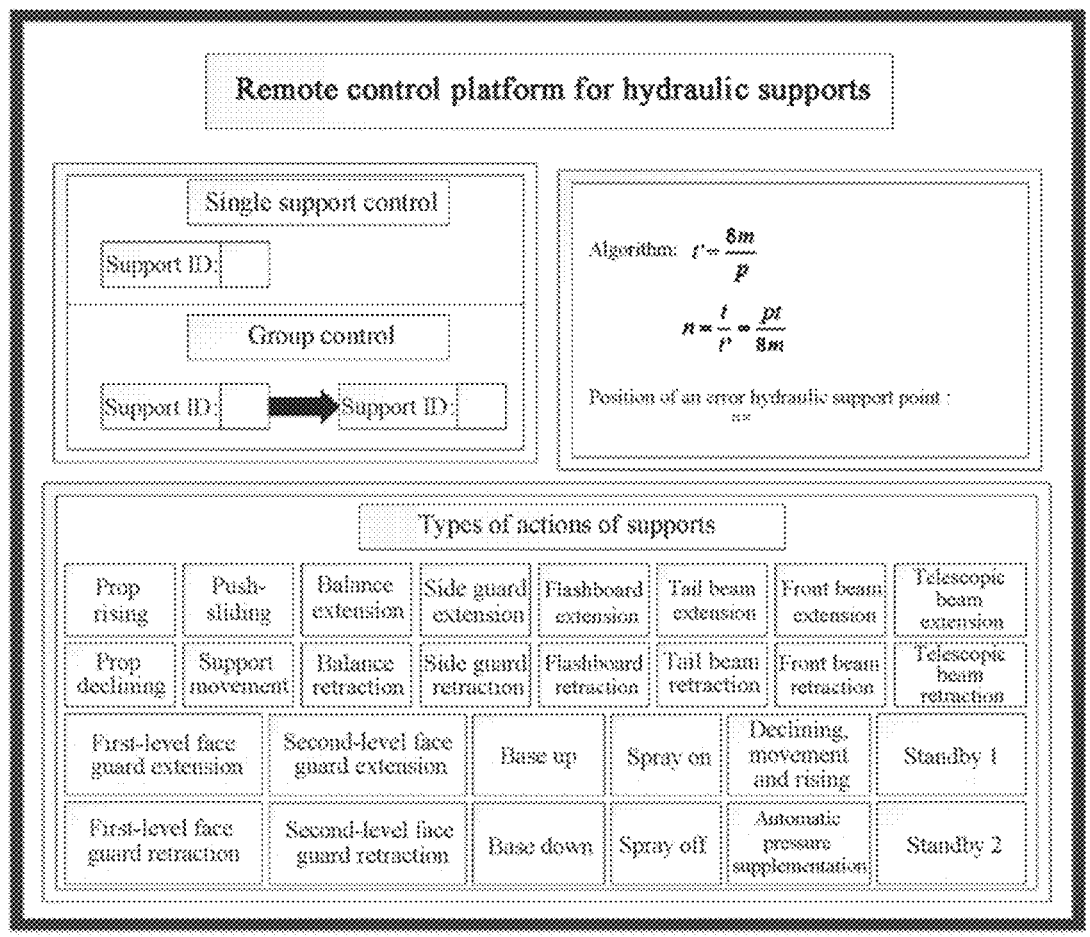
FIG. 5 is an interface diagram of a control panel of the present invention.

As shown in FIG. 1, FIG. 2 and FIG. 5, a system for remotely locating a communication error support for hydraulic supports includes a control panel configured to display a communication error support address and a control command, a support controller, a data converter inserted into a bus interface of the support controller, and two support drivers of the same type connected with interfaces of the support controller. Each support driver has two bus interfaces respectively connected to a CANH twisted pair and a CANL twisted pair. The control panel transmits the control command to the data converter in a form of a WiFi signal. The data converter converts the WiFi signal into a message signal and transmits the message signal to the support controller. The support controller transmits the control command to the two support drivers, respectively. The support drivers transmit the command through the CANH twisted pair and the CANL twisted pair. When a bus for transmitting the command of a certain node has an error, the support controller calculates the fault node according to a formula $$n = \frac{pt}{8m},$$

and feeds back the fault node onto the control panel, where m is the number of bytes of a message transmitted at each time; t is time timed by a timer; and p is a network speed of a CAN bus, and a unit is kbps.

Each controller corresponds to two support drivers, and interfaces corresponding to each support driver are connected with two twisted pairs, respectively. Since the same command message is transmitted to the two drivers, even if one circuit is faulted, the control command may also be transmitted to the other two twisted pairs through the other driver. Therefore, an action process of the hydraulic support may not be delayed. Once a certain communication node is faulted, the support controller may automatically detect a specific position of the fault node according to a preset program, and feeds back the position to the control panel, so that an underground worker may clear a fault quickly and accurately.

Further, the support controller has a timing module and a counting module.

In order not to delay a production task, the system further includes an Ethernet control module. The data converter is an Ethernet switchboard, a fiber switch and a fiber switchboard. In a daily state, the Ethernet control module is in a dormant state, and the Ethernet control module is activated when buses corresponding to the support drivers are all faulted, so that the control panel may transmit the control command through an Ethernet.

A method for remotely locating a communication error support for hydraulic supports includes the following steps:

step I, a program is initialized. A control panel transmits a command to a support controller through a data converter. The support controller transmits information to two drivers, respectively.

step II, the two drivers receive the command, and transmit the command to CANH twisted pairs and CANL twisted pairs, wherein by a principle of time optimization, the command reaching the twisted pairs at first is used as a receiving command, and a response command is returned to the controller according to an original path and finally transmitted to the control panel.

step III, the command transmission is forced to be ended when a bus for transmitting the command of a certain node has an error. The support controller repeatedly transmits the command again. A timer is triggered when a message is transmitted for the (N+1)th time. Timing is ended when a transmitted signal reaches the fault node. If a main node is a first hydraulic support, the nth hydraulic support is faulted, and the main node is a hydraulic support node corresponding to the support controller.

step IV, the support controller calculates the fault node according to a formula $$n = \frac{t}{t'} = \frac{pt}{8m},$$

and feeds back the fault node onto the control panel, where m is the number of bytes of the message transmitted at each time; t is time timed by a timer; and p is a network speed of a CAN bus, and a unit is kbps.

In the step III, the support controller repeatedly transmits the command again, and the timer is triggered when the message is transmitted for the (N+1)th time. N is equal to 20.

Figure 3:
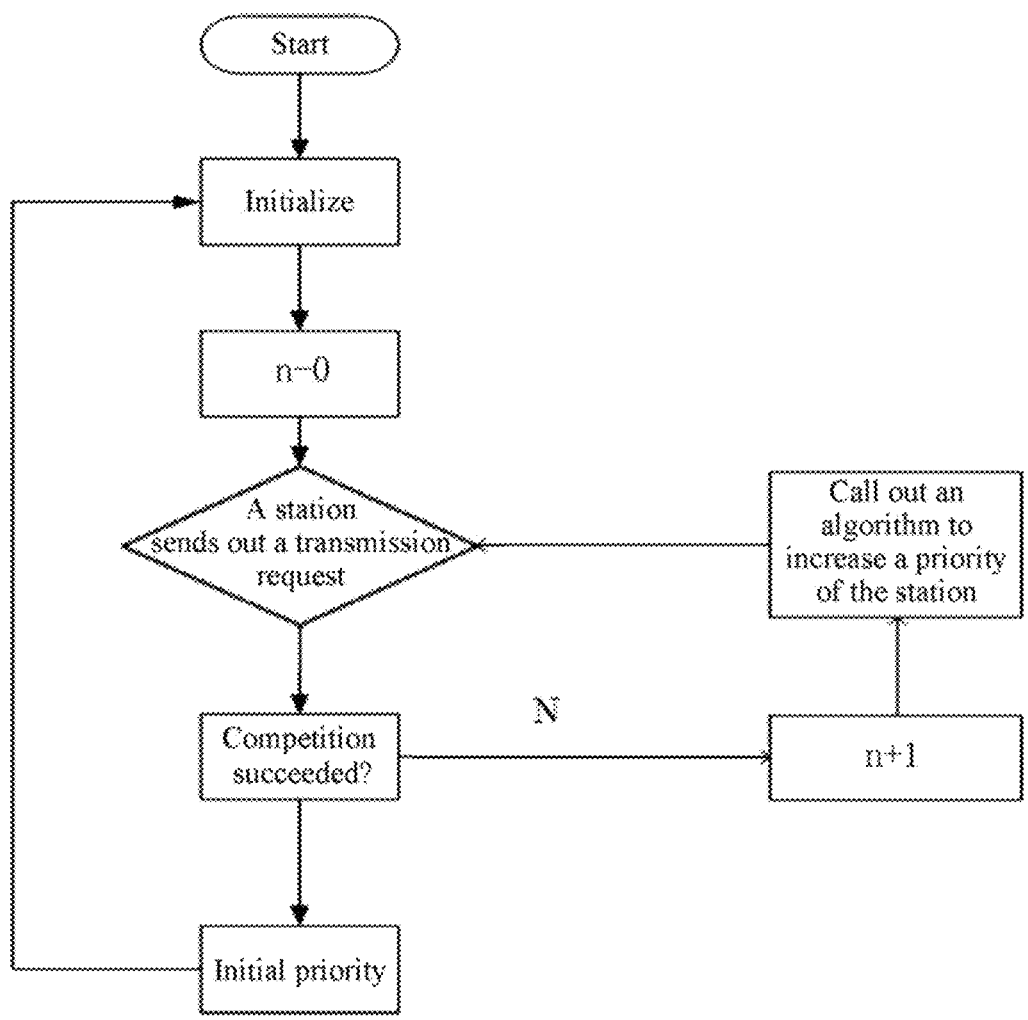
FIG. 3 is a flow chart of a method for changing a low priority message in real time.

In order to meet a requirement for the instantaneity of underground hydraulic supports, the number N of times of transmitting the command by the support controller cannot be set to be too large, so as to avoid a time delay. However, if the number N is set to be too small, stations with lower priorities may still fail in multiple competitions, and an operator may misinterpret the reason that a station has a low priority and the message is not successfully transmitted as a CAN bus error that fails message transmission. Therefore, when a plurality of stations transmits messages to the controller at the same time, the stations with higher priorities can successfully complete data transmission. In order to increase the probability of success in the next competition for the stations that fail in the last round of competition, this objective may be achieved by changing their priorities. A position of a certain node p in a queue may be expressed as:
$L_p=L_0-15n$
where $L_p$ is a level of the node p in the queue at a certain moment. $L_0$ is an initial level of the node p in the queue, for example, a station coded 11111111 is at the lowest level which is $2^8-1=255$. 15n is a core of this algorithm, that is, $L_0$ is decreased by subtracting the initial level by this item, so that the level of the station is increased, and the probability of the next competition is increased. n is the number of times of failures of competition. An implementation flow of this algorithm is as shown in FIG. 3. Even if the initial priority is the lowest level 255, the priority may be increased to the highest level under at most 17 failures of competition. Therefore, N is set to be 20.

Figure 4:
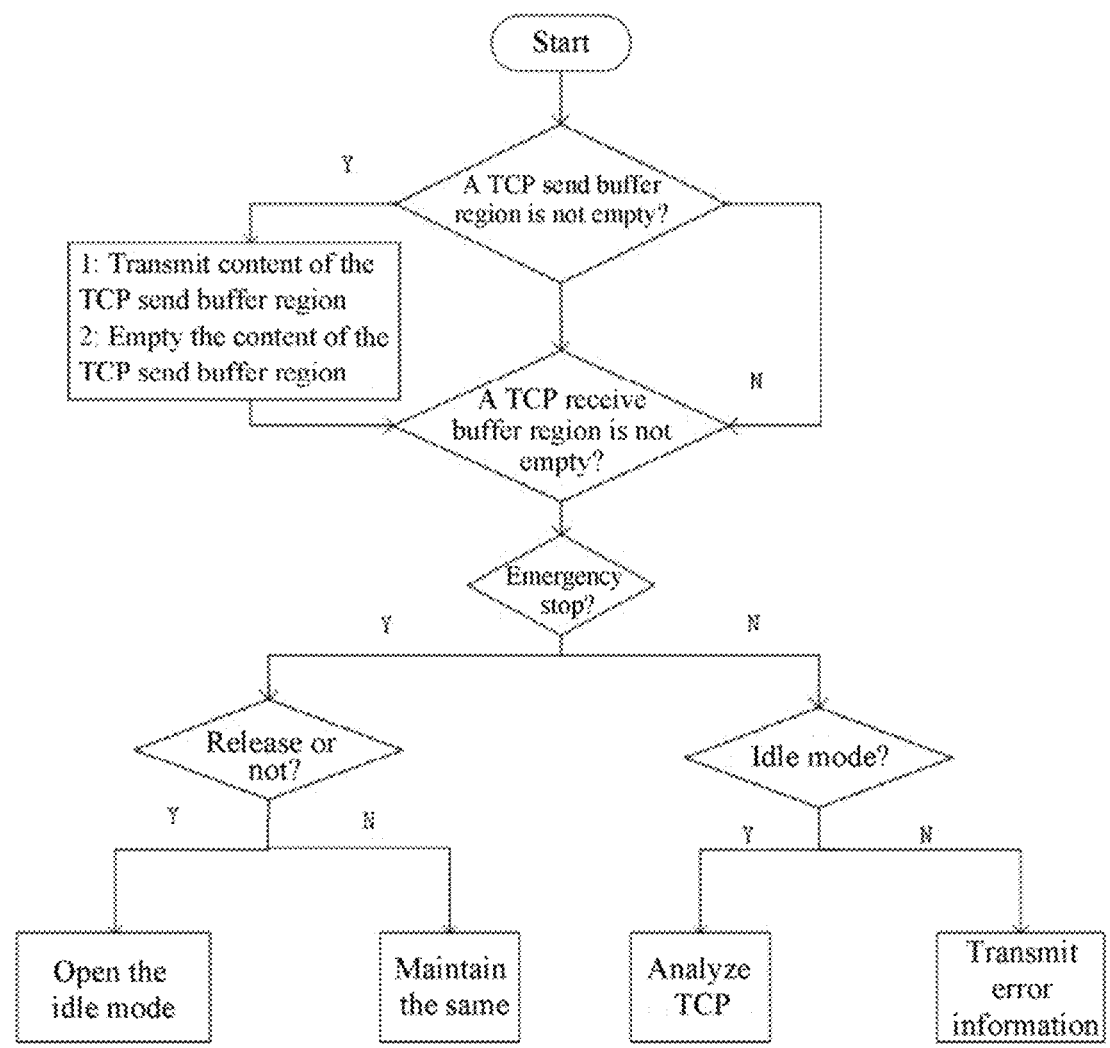
FIG. 4 is a flow chart of Ethernet control.

In the step III, when two buses of a certain hydraulic support are both faulted in transmission, an Ethernet control module is switched to a working mode, and transmits the command sent from the control panel to the support controller through an Ethernet switchboard, a fiber switch and a fiber switchboard. A specific control process flow is as shown in FIG. 4 to determine whether an Ethernet is in an idle mode or the working mode.

Preferably, the data converter is CANWiFi-200T.

Preferably, the support controller is an SJA1000 controller.

Preferably, the drivers are PCA82C250.

Preferably, when the support drivers control groups of hydraulic supports, each group includes 5 or less hydraulic supports.

What is claimed is:

1. A system for remotely locating a communication error support for hydraulic supports, comprising:
    a control panel, configured to display a communication error support address and a control command,
    a support controller,
    a data converter, inserted into a bus interface of the support controller, and
    two support drivers of the same type, connected with interfaces of the support controller; wherein
    each of the two support drivers of the same type has two bus interfaces respectively connected to a CANH twisted pair and a CANL twisted pair; the control panel transmits the control command to the data converter in a form of a WiFi signal; the data converter converts the WiFi signal into a message signal and transmits the message signal to the support controller; the support controller transmits the control command to the two support drivers of the same type, respectively; the two support drivers of the same type transmit the control command through the CANH twisted pairs and the CANL twisted pairs; when a bus for transmitting the control command of a node has an error, the support controller calculates a fault node according to a formula $$n = \frac{pt}{8m},$$

and feeds back the fault node onto the control panel, where m is a number of bytes of a message transmitted at each time; t is a time timed by a timer; and p is a network speed of a CAN bus, and a unit of the network speed of the CAN bus is kbps.

2. The system for remotely locating the communication error support for the hydraulic supports according to claim 1, wherein, the support controller has a timing module and a counting module.

3. The system for remotely locating the communication error support for the hydraulic supports according to claim 2, wherein, the system for remotely locating the communication error support for the hydraulic supports further comprises an Ethernet control module, and the data converter is an Ethernet switchboard, a fiber switch and a fiber switchboard.

4. A method for remotely locating a communication error support for hydraulic supports, comprising the following steps:
    step I, initializing a program; transmitting, by a control panel, a command to a support controller through a data converter; transmitting, by the support controller, information to two drivers, respectively;
    step II, receiving, by the two drivers, the command; and transmitting the command to CANH twisted pairs and CANL twisted pairs, wherein by a principle of time optimization, a command reaching the twisted pairs at first is used as a receiving command, and a response command is returned to the support controller according to an original path and is transmitted to the control panel;

step III, forcing command transmission to be ended when a bus for transmitting the command of a node has an error; repeatedly transmitting, by the support controller, the command again; triggering a timer when a message is transmitted for the (N+1)th time; ending timing when a transmitted signal reaches a fault node, wherein if a main node is a first hydraulic support of the hydraulic supports, a nth hydraulic support of the hydraulic supports is faulted, and the main node is a hydraulic support node corresponding to the support controller; and step IV, calculating, by the support controller, the fault node according to a formula $$n = \frac{t}{t'} = \frac{pt}{8m},$$

and feeding back the fault node onto the control panel, wherein m is a number of bytes of the message transmitted at each time; t is a time timed by a timer; and p is a network speed of a CAN bus, and a unit of the network speed of the CAN bus is kbps.

5. The method for remotely locating the communication error support for the hydraulic supports according to claim 4, wherein, in the step III, N is equal to 20.

6. The method for remotely locating the communication error support for the hydraulic supports according to claim 5, wherein, in the step III, when two buses of a hydraulic support of the hydraulic supports are faulted in transmission, an Ethernet control module is switched to a working mode, and transmits the command sent from the control panel to the support controller through an Ethernet switchboard, a fiber switch and a fiber switchboard.

7. The method for remotely locating the communication error support for the hydraulic supports according to claim 6, wherein, when support drivers control groups of hydraulic supports, each group of the groups of hydraulic supports comprises 5 or less hydraulic supports.

8. The method for remotely locating the communication error support for the hydraulic supports according to claim 5, wherein, when support drivers control groups of hydraulic supports, each group of the groups of hydraulic supports comprises 5 or less hydraulic supports.

9. The method for remotely locating the communication error support for the hydraulic supports according to claim 4, wherein, the data converter is a converter configured to convert a CAN to a wireless network.

10. The method for remotely locating the communication error support for the hydraulic supports according to claim 9, wherein, when support drivers control groups of hydraulic supports, each group of the groups of hydraulic supports comprises 5 or less hydraulic supports.

11. The method for remotely locating the communication error support for the hydraulic supports according to claim 4, wherein, the support controller is a stand-alone CAN controller.

12. The method for remotely locating the communication error support for the hydraulic supports according to claim 11, wherein, when support drivers control groups of hydraulic supports, each group of the groups of hydraulic supports comprises 5 or less hydraulic supports.

13. The method for remotely locating the communication error support for the hydraulic supports according to claim 4, wherein, when support drivers control groups of hydraulic supports, each group of the groups of hydraulic supports comprises 5 or less hydraulic supports.

14. The method for remotely locating the communication error support for the hydraulic supports according to claim 13, wherein, when support drivers control groups of hydraulic supports, each group of the groups of hydraulic supports comprises 5 or less hydraulic supports.

* * * * *